US008248948B2

(12) United States Patent
Weil et al.

(10) Patent No.: US 8,248,948 B2
(45) Date of Patent: Aug. 21, 2012

(54) MONITORING NETWORK CONDITIONS OF A WIRELESS NETWORK

(75) Inventors: Kevin Weil, Redwood City, CA (US);
Mukesh Gupta, Milpitas, CA (US);
Amit Saha, Sunnyvale, CA (US); Cyrus Behroozi, Menlo Park, CA (US);
Devabhaktuni Srikrishna, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 302 days.

(21) Appl. No.: 11/823,949

(22) Filed: Jun. 29, 2007

(65) Prior Publication Data
US 2008/0247317 A1 Oct. 9, 2008

Related U.S. Application Data

(60) Provisional application No. 60/921,761, filed on Apr. 3, 2007.

(51) Int. Cl.
*G01R 31/08* (2006.01)
(52) U.S. Cl. .................................................. 370/237
(58) Field of Classification Search .................. 370/241, 370/241.1, 242, 245, 252, 216
See application file for complete search history.

(56) References Cited

U.S. PATENT DOCUMENTS

| | | | |
|---|---|---|---|
| 4,643,325 A | 2/1987 | Streit | |
| 5,457,850 A | 10/1995 | Knox | |
| 7,024,187 B2 * | 4/2006 | Moles et al. | 455/423 |
| 7,107,049 B2 * | 9/2006 | Barberis et al. | 455/423 |
| 7,376,087 B2 * | 5/2008 | Srikrishna | 370/238 |
| 7,639,642 B2 * | 12/2009 | Williams et al. | 370/328 |
| 2004/0054774 A1 * | 3/2004 | Barber et al. | 709/224 |
| 2005/0020265 A1 * | 1/2005 | Funabiki et al. | 455/436 |
| 2005/0164684 A1 | 7/2005 | Chen et al. | |
| 2005/0176418 A1 * | 8/2005 | Leib et al. | 455/423 |
| 2005/0249122 A1 * | 11/2005 | Wheeler et al. | 370/241 |
| 2005/0254474 A1 * | 11/2005 | Iyer et al. | 370/338 |
| 2006/0083356 A1 | 4/2006 | Adams et al. | |
| 2006/0133387 A1 * | 6/2006 | Pekhteryev et al. | 370/400 |
| 2006/0146875 A1 * | 7/2006 | Yang | 370/468 |
| 2006/0168128 A1 * | 7/2006 | Sistla et al. | 709/219 |
| 2006/0191690 A1 | 8/2006 | Severin et al. | |
| 2006/0199530 A1 * | 9/2006 | Kawasaki | 455/7 |
| 2006/0215581 A1 * | 9/2006 | Castagnoli | 370/254 |
| 2006/0215583 A1 * | 9/2006 | Castagnoli | 370/254 |
| 2007/0070911 A1 * | 3/2007 | Goldberg et al. | 370/248 |
| 2007/0086378 A1 * | 4/2007 | Matta et al. | 370/329 |
| 2007/0099624 A1 * | 5/2007 | Guo | 455/453 |
| 2007/0127559 A1 | 6/2007 | Chang | |

(Continued)

OTHER PUBLICATIONS

Blohm & Voss, Pipe Handling Equipment, Drill Pipe spinner, 2004. 2pp.

(Continued)

*Primary Examiner* — Kwang B Yao
*Assistant Examiner* — Jung-Jen Liu
(74) *Attorney, Agent, or Firm* — Brian R. Short

(57) ABSTRACT

A method of determining a location of a network condition within a wireless mesh network is disclosed. The method includes a test device testing a first plurality of wireless hops of the wireless mesh network. The test device also tests a second number of wireless hops of the wireless mesh network. The test device locates the network condition within the wireless mesh network by comparing the test of the first plurality of wireless hops with the test of the second number of wireless hops.

18 Claims, 5 Drawing Sheets

U.S. PATENT DOCUMENTS

| | | | |
|---|---|---|---|
| 2008/0080507 A1* | 4/2008 | Swallow et al. | 370/392 |
| 2008/0205360 A1* | 8/2008 | Ren et al. | 370/338 |
| 2008/0209517 A1* | 8/2008 | Nightingale et al. | 726/3 |
| 2008/0225737 A1* | 9/2008 | Gong et al. | 370/252 |
| 2009/0092082 A1* | 4/2009 | Twitchell, Jr. | 370/328 |
| 2009/0147760 A1* | 6/2009 | Lee et al. | 370/338 |
| 2009/0252043 A1* | 10/2009 | Daniel | 370/241 |
| 2009/0290527 A1* | 11/2009 | Guy et al. | 370/315 |

OTHER PUBLICATIONS

Oil Country Manufacturing, Inc., General Catalog, 2005, Cover Page and 5 pp.

* cited by examiner

MONITORING NETWORK CONDITIONS OF A WIRELESS NETWORK

CROSS-REFERENCE TO RELATED APPLICATION(S)

The present application is based on and claims the benefit of U.S. Provisional Patent Application Ser. No. 60/921,761, entitled "Quantifying End User Experience", filed on Apr. 3, 2007, the disclosure of which is hereby incorporated by reference in entirety for all purposes.

FIELD OF THE DESCRIBED EMBODIMENTS

The described embodiments relate generally to wireless communications. More particularly, the described embodiments relate to a method and apparatus for monitoring network conditions of a wireless network.

BACKGROUND

Wireless networks typically allow a wireless device to connect to the wireless networks through a base station or access point that is wired to the network. Wireless mesh networks can additionally include access points that are wirelessly connected to the network. The wireless device can transmit data packets that are received by the base station or access point and then routed through the network. The wireless network can include many base stations or access points that are each wired to the network.

Due to the interconnectivity of many devices within a wireless mesh network, activities and conditions of devices within a wireless mesh network can greatly influence the operation of other devices within the mesh network. For example, load imbalances in one area of a mesh network can adversely affect the operation of the mesh network at other locations. Additionally, channel selections and routing path selections of devices can adversely affect the operation of other devices within the mesh network.

Wireless networks include wireless links that are susceptible to interference. Wireless mesh networks typically include many wireless links, and therefore, can be particularly susceptible to interference. One form of interference is self interference, in which a wireless link within the wireless mesh network receives interfering signals from other wireless links of the wireless mesh network. As packets are relayed through the wireless mesh network, they can suffer from the effects of self-interference, and/or they may cause self-interference for other links within the wireless mesh network.

The self-interference can limit the air-time availability to nodes of a wireless network. That is, the self-interfering signals of a node within a wireless network occupy transmission air-time, thereby limiting the transmission air-time available to other nodes of the wireless network. Nodes that have poor quality wireless links can be particularly problematic because they typically require low-order modulation formats, and packet re-transmissions. Lower order modulation formats and re-transmissions can both cause the air-time per bit efficiency to drop, resulting in the occupation of more air-time, and therefore, adversely affecting other nodes.

It is desirable to have a method and apparatus for monitoring conditions of a wireless network. It is additionally desirable to be able to locate network conditions, and correlate conditions and activities of the wireless network with operating parameters of the wireless network.

SUMMARY

An embodiment includes a method of determining a location of a network condition within a wireless mesh network. The method includes a test device testing a first plurality of wireless hops of the wireless mesh network. The test device also tests a second number of wireless hops of the wireless mesh network. The test device locates the network condition within the wireless mesh network by comparing the test of the first plurality of wireless hops with the test of the second number of wireless hops.

Another embodiment includes a method of a network test device sensing a network condition. The method includes a wireless network test device sensing a wireless network parameter, and the wireless network test device triggering an alert if a wireless network parameter exceeds or falls below a threshold.

Other aspects and advantages of the described embodiments will become apparent from the following detailed description, taken in conjunction with the accompanying drawings, illustrating by way of example the principles of the described embodiments.

DETAILED DESCRIPTION

The embodiments described provide methods of locating network conditions of wireless networks. Additionally, wireless network parameters can be sensed at one or more locations within the wireless network, and used to modify operation of the wireless network. Correlations between wireless network parameters and activities and conditions of the network can be used to modify operation of the wireless network.

The following embodiments and descriptions are directed to wireless mesh networks. However, it is to be understood that the embodiments described are not limited to wireless mesh networks. Wireless networks in general can benefit from the methods of locating and monitoring network conditions.

Figure 1:
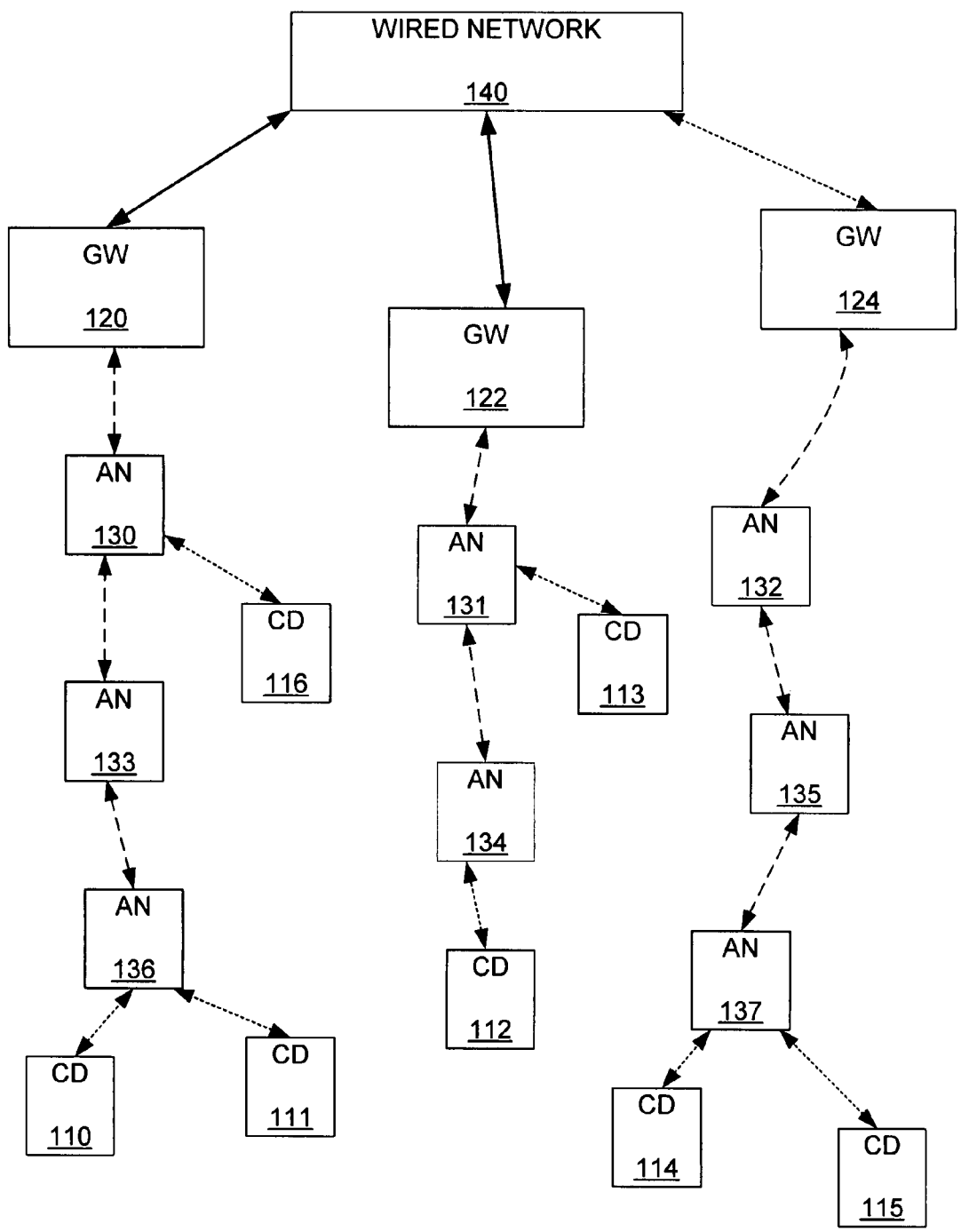
FIG. 1 shows an example of a wireless mesh network.

FIG. 1 shows an example of a wireless mesh network that includes gateways 120, 122, 124, access nodes 130-137 and client devices 110-116. The wireless access nodes 130-137 interconnect with each other, and with gateways 120, 122, 124 to form a mesh.

One embodiment of a gateway originates routing beacons that the access nodes can use to select routes to at least one gateway based on a persistence of successfully received routing beacons. The gateways typically include a backhaul (wired or wireless) to a wired network 140 that provides access to the internet.

An access node can generally be defined as being a device that a client device can associated with, and therefore, obtain access to the mesh network. A gateway can typically operate as an access node. One embodiment of an access node re-broadcasts successfully received routing beacons (from either an upstream gateway or access node).

A client generally can include a laptop computer, a personal digital assistant (PDA), a cell-phone, or any other device that includes as interface card adaptable for use with the mesh network of the invention. The client can access the network though wired or wireless connections. Wireless clients can access the network through a MAC (media access control), PHY (physical layer) protocol such as IEEE 802.11. The 802.11 protocol includes authentication and association protocols between client devices and the network.

The access nodes 130-137 form routing paths through the wireless mesh network. Client devices 110-116 wirelessly connect to any one of the gateways 120, 122, 124 or access nodes 130-137 to obtain a data path to the wired network 140. An embodiment of the access nodes selects routing paths to at least one gateway based on a persistence of successfully received routing beacons.

The example of a wireless mesh network of FIG. 1 includes the three gateways 120, 122, 124. Each gateway 120, 122, 124 defines a cluster. For example, a first cluster of the gateway 120 includes access nodes 130, 133, 136. A second cluster of the gateway 122 includes access nodes 131, 134. A third cluster of the gateway 124 includes the access nodes 132, 135, 137.

Due to the interconnectivity of mesh network, activities or conditions of one part of the mesh network can influence the operation of other parts of the mesh network. Additionally, the interconnections are wireless links, and therefore, the air-time occupied by wireless links of each of the access nodes 130-137 and client device 110-116 can affect the operation of other devices of the mesh network because there is only a finite amount of air-time available.

Conditions of a device (gateway or access node) located at one part of a wireless network can influence the operating of devices elsewhere within the wireless network. For example, device (gateway or access node) loading, device routing selections through the mesh network, bandwidth of the device, latency of the device, channel selections of the devices and any malfunction of the devices can all influence the operation of other wireless network devices.

Loading of one device can influence the operation of other devices because a device that is subject to a large amount of data traffic (due, for example, to a large client load) can adversely influence the operating parameters of all devices downstream of the device. For example, if an access node within the wireless mesh network has many downstream clients, then the bandwidth available to each client can be limited. More generally, the bandwidth to all devices downstream of the heavy-loaded device will be influenced. Additionally, excessive loading generally occupies large amounts of air-time, and therefore, also can influence other devices within the wireless mesh that are not downstream of the device.

Routing selections of one device can influence the operation of other devices within the mesh network because poor routing selections can result in poor quality links within a routing path to a gateway. Poor quality links can cause a host of problems, such as, low throughput and excessive air-time occupation. Poor link quality affects the air-time occupied by signals transmitted through the link because poor links typically require the signals to have lower-order modulation formats. Therefore, the amount of air-time occupied per bit goes up. Additionally, poor quality links typically require more re-transmissions, which also increases the air-time occupied per bit. If a poor link is located several hops downstream from a gateway, all of the links between the gateway and the client device operating on the same or overlapping frequency additionally occupy air-time as dictated by the last link to the client device.

Routing selections also influence the loading of devices within the network, which as previously described, influences other devices. Routing selections can also influence the latency of data traffic.

Bandwidth of one device can influence the operation of other devices because throughput of a device influences all devices downstream of the device. A limited throughput can also cause more air-time to be occupied when attempting to maintain a given data rate. Additionally, a limited throughput will typically cause additional latency.

Latency of one device can influence the operation of other devices because excessive latency of a device can slow the operation of all devices downstream of the device. This can also cause additional use of air-time.

Depending upon the physical locations of the access nodes, certain access nodes are more likely to interfere with other nodes of the wireless network. Neighbor nodes can be defined as other nodes that can receive signals from a node, wherein the received signals have a predetermined amount of signal strength. Neighboring nodes can be a source of self-interference, and can cause the air-time available to a node to fall below desirable levels.

All wireless communication between the nodes occupies air-time. Air-time is additionally occupied when client devices 110-115 are connected to the wireless mesh network. The time occupied by each client device connection is generally not equal. That is, the air-time occupied can vary greatly from client device to client device. Generally, the air-time occupied by a client device is dependent upon the qualities of the links between the client device and the gateway the client device is routed to, and the number of wireless hops (a hop is a wireless link) between the client device and the gateway. The more wireless hops a link is away from a gateway, the greater the effect a link can have on the available air-time capacity. That is, each link between the client device and the connecting gateway occupies air-time.

Generally, a range exists around an access node (such as access node 134) in which wireless links within this range can reduce the air-time available to the access node 134. Medium access protocols such as IEEE 802.11 implement Carrier Sense Multiple Access with Collision Avoidance (CSMA/CA). In such protocols, transceivers sense a channel and defer transmissions while the channel is considered to be busy. The channel is deemed to be busy if a received signal exceeds a Clear Channel Assessment Threshold (CCAT), and the nodes can no longer transmit any signals. Therefore, if the access node 134 is receiving transmission signals from at least one of the wireless links within the reception range, the access node 134 may be unable to either receive or transmit signals. As such, at some point the available air-time can become so limited that the access node 134 cannot properly operate within the wireless mesh network.

Wireless network parameters of each individual device can provide an indication the operation of the device itself. For example, a client device or access node within the mesh network has network parameters, such as, received signal strength, receive signal SNR, upstream data throughput, downstream throughput (for an access node), latency, Quality of Service (QoS) and/or available air time, which provide an indication of the operation of the device. Each of these network parameters can be influenced by the activities and/or conditions of other devices within the wireless network.

Figure 2:
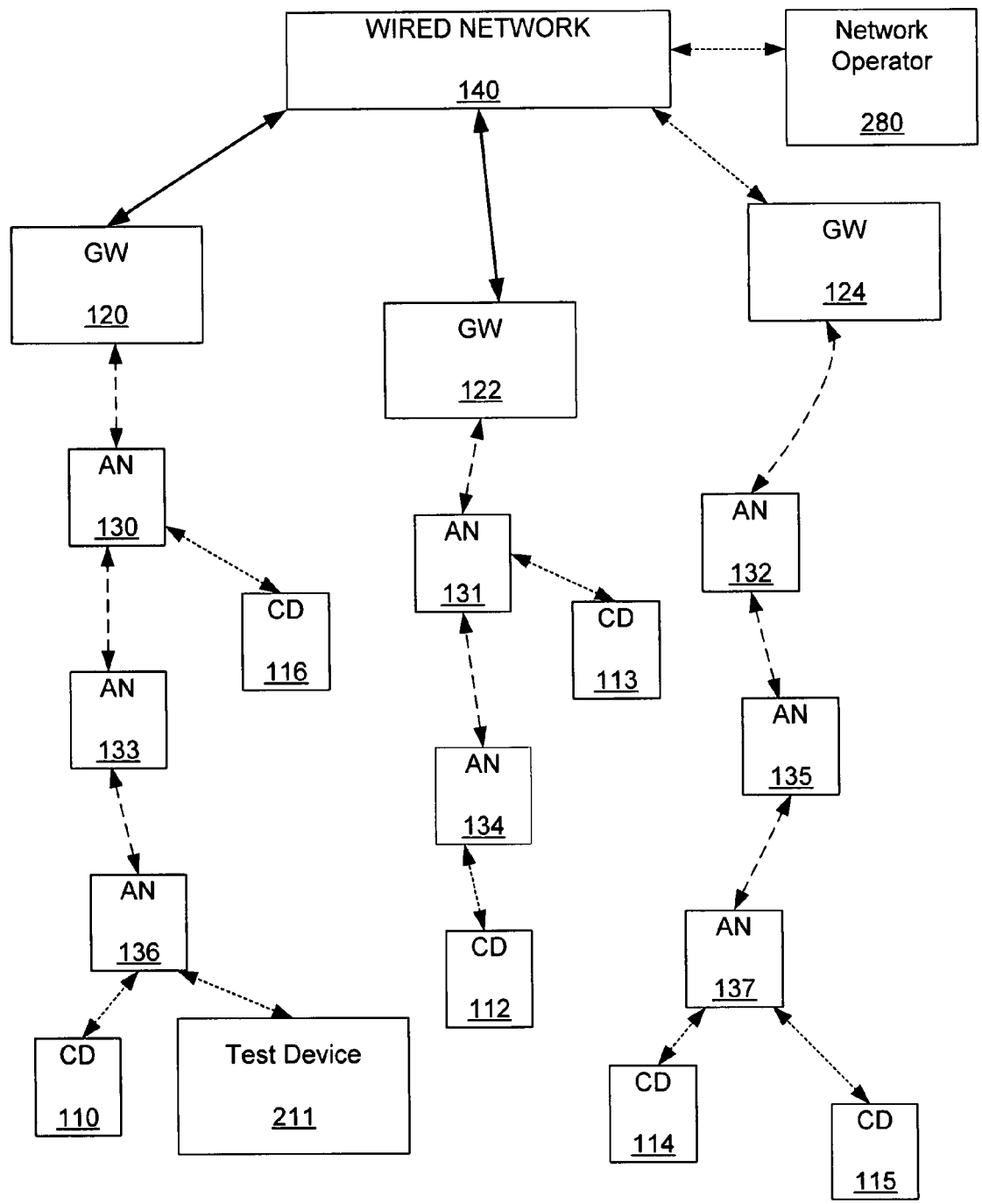
FIG. 2 shows an example of a client test device connected to a wireless mesh network.

FIG. 2 shows an example of a client test device 211 connected to a wireless mesh network. For an embodiment, the client test device 211 monitors wireless network performance information as is expected to be experienced by a client device associated with the wireless network. The client test device 211 similarly placed can be used to locate problems within the wireless network. The client test device 211 can, for example, alert a network operator 280 of identified network conditions and the locations of the network conditions.

One embodiment of the client test device 211 tests multiple hops of the wireless mesh network to identify a location of a network condition. The network conditions can include, for example, an upstream (or downstream) device that is exhibiting behavior that may be detrimental to the operation of the wireless network. For example, the device may have excessive upstream latency, excessive downstream latency, excessive upstream throughput, excessive downstream throughput, a high number of packet retries per packet, packet success probability, reverse packet success probability and antenna asymmetry. The network condition may be degrading the network performance as experienced by the test client device. Identification of the location of the network condition can be valuable information that can be used to eliminate or mitigate the effects the condition has on the performance of the wireless network.

One method of locating the network condition includes testing the condition over a first number of wireless hops and then testing the condition over a different number of wireless hops. Comparison of the two tests can provide information regarding the location of the network condition. One embodiment method of locating the network condition includes running a trace route test over the two different numbers of wireless hops.

One embodiment of a latency network condition test includes sending a probe packet from the test device to a first target device located a first number of wireless hops from the test device, having the first target device send a probe packet back to the test device, and measuring the round trip travel time of the probe packets. The test device can locate latency network conditions by then sending another probe packet from the test device to second target device located a second number of wireless hops from the test device, and comparing the round trip travel time for probe packets of the first and second target devices.

One embodiment of a throughput (upstream) network condition test includes sending as many data packets as possible during a predetermined length of time (for example, 2 seconds) from the test device to the first target device located the first number of hops away, and measuring the number of packets sent. Packets that fail to be received by the first target device are retried (transmitted again) because an acknowledgement (ACK) is not received. The measured number of packets sent is multiplied by the bytes/packet, and divided by the predetermined length of time to obtain the throughput between test device and the first target device. The same process repeated with the second target device located the second number of wireless hops away from the test device to obtain the throughput between the test device and the second target device.

A downstream throughput test can be testing using methods similar to the upstream throughput test. However, the first and second target devices can be instructed to send as many data packets as possible during the predetermined length of time (for example, 2 seconds) from the target devices to the test device. Packets that fail to be received by the test device are retried (transmitted again) because an acknowledgement (ACK) is not received. The measured number of packets sent is multiplied by the bytes/packet, and divided by the predetermined length of time by both the first target device and the second target device to obtain the throughput between target devices and the test device.

One embodiment of a packet retry network condition test includes the test device transmitting, for example, 802.11 protocol unicast packets. The unicast packets must receive an ACK, otherwise, the unicast packets are resent (retried). The number of retries can be counted for unicast packets sent to both the first target device and the second target device. The results can be compared to locate a network condition.

Other network conditions can include parameters that reflect link qualities of links within paths between the test device and the first and second target devices. For example, signal strength (received), noise (for example, SNR), packet success probability (typically, in the downstream direction), reverse packet success probability (typically, in the upstream direction) and antenna asymmetry (typically measured by comparing the signal quality (by, for example, measuring the success rate of received packets) of signals of more than one antenna of the device) of a device can all be monitored by the devices within the upstream and downstream paths. The test device can request these link quality parameters from the first and second target devices, allowing the test device to locate network conditions related to link quality parameters.

An exemplary embodiment can include detecting an air-time capacity problem, and then modifying operation of other devices to mitigate the air-time capacity problem. The embodiments of controlling air-time include sensing an air-time availability problem, and taking steps to reduce the problem. Other embodiments include taking steps to help ensure that air-time availability problems don't occur.

Figure 3:
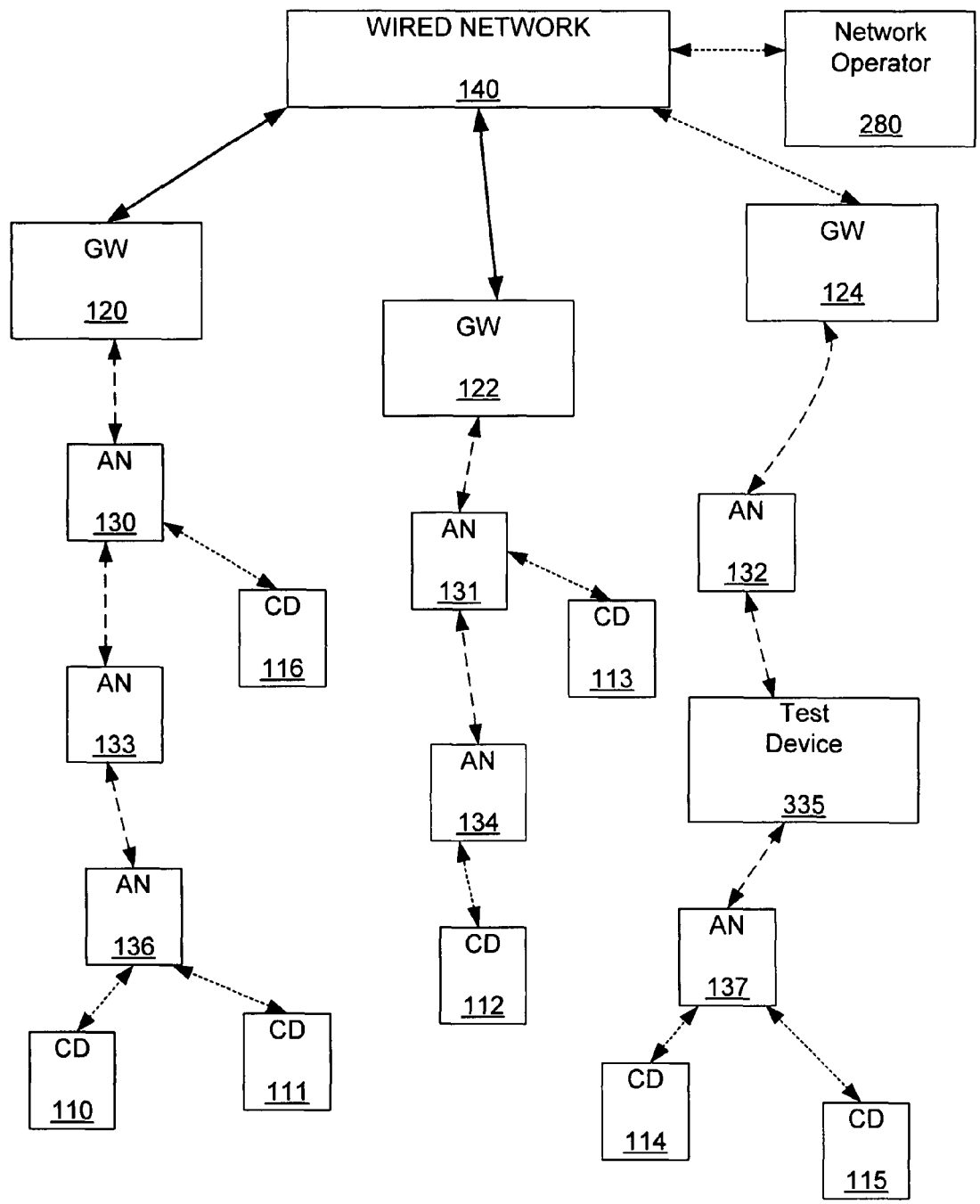
FIG. 3 shows an example of access node test device connected to a wireless mesh network.

FIG. 3 shows an example of network node test device 335 connected to a wireless mesh network. For an embodiment, the node test device 335 monitors wireless network performance information as expected to be experienced by a similarly placed node of the wireless network.

Fundamentally, the node test devices can operate at a higher transmit power than the client test devices. The node test devices are located within the wireless mesh network, and can have both upstream and downstream paths. Additionally, node test devices can be placed at a higher elevation (typically, for example, at the top of a street light) than the client test devices. All of these differences can change the network conditions experienced by the test devices.

One embodiment of the node test device 335 tests multiple hops of the wireless mesh network to identify a location of a network condition. The network condition can include, for example, an upstream (or downstream) device that is exhibiting behavior that may be detrimental to the operation of the wireless network. For example, the device may have excessive upstream latency, excessive downstream latency, excessive upstream throughput, excessive downstream throughput, a high number of packet retries per packet, packet success probability, reverse packet success probability and/or antenna asymmetry. The network condition may be degrading the network performance as experienced by the node test device. Identification of the location of the network condition can be a valuable piece of information that can be used to eliminate or mitigate the effects the condition has on the performance of the wireless network.

One method of locating the network condition includes testing the condition over a first number of wireless hops and then testing the condition over a different number of wireless hops. Comparison of the two tests can provide information regarding the location of the network condition. One embodiment method of locating the network condition includes running a trace route test over the two different numbers of wireless hops.

The methods of determining network condition latency, throughput (upstream and upstream), packet retries (upstream and downstream), signal strength, noise, packet success probability (forward, reverse, upstream and downstream), an antenna asymmetry tests for the node test device can be similar to the client test device methods previously described. One fundamental difference, however, is that the node test devices typically have downstream target devices as well.

Figure 4:
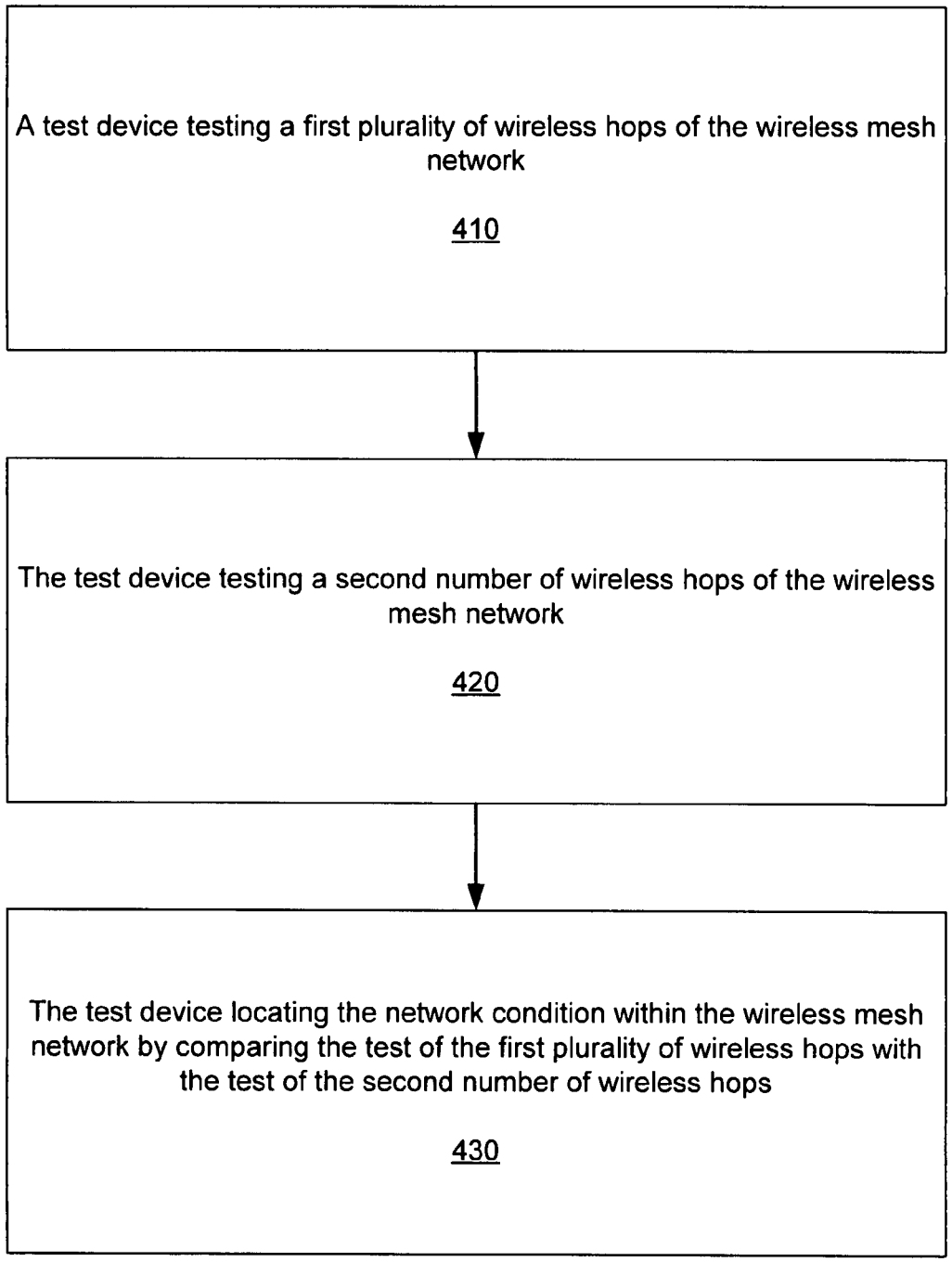
FIG. 4 is a flow chart that shows one example of steps of a method for determining a location of a network condition within a wireless mesh network.

FIG. 4 is a flow chart that shows one example of steps of a method for determining a location of a network condition within a wireless mesh network. A first step 410 includes a test device testing a first plurality of wireless hops of the wireless mesh network. A second step 420 includes the test device testing a second number of wireless hops of the wireless mesh network. A third step 430 includes the test device locating the network condition within the wireless mesh network by comparing the test of the first plurality of wireless hops with the test of the second number of wireless hops.

The testing the first plurality of wireless hops and/or testing of the second number of hops can include testing at least one of a upstream latency, downstream latency, upstream throughput, downstream throughput, a number of packet retries, packet success probability, reverse packet success probability and antenna asymmetry of at least one of the first plurality of wireless hops.

The testing device emulates a client device connected to the wireless mesh network, or the testing device emulates an access node connected to the wireless mesh network. The testing device emulating a client device is typically connected to an upstream access node. The testing device emulating an access node can be wirelessly connected to at least one upstream gateway or access node, and can include any number of downstream access nodes and/or client devices. The test device can test any number of upstream or downstream wireless hops.

Embodiments of the test device can determine wireless network parameters including receive signal strength, receive signal SNR, transmission retries, upstream data throughput, downstream data throughput, latency, and/or available air-time. If one or more of the wireless network parameter exceeds or falls below a threshold, an alert can be triggered, alerting a network manager, or another device within the wireless network.

One embodiment of the test device emulating a client device includes the test device downloading specific web pages. The performance of the download can be monitored, providing for the identification of wireless network conditions. The web page can be selected from a very popular web site because popular web sites have a greater likelihood of being operational. The test can include timing how long it takes to download the web page.

For an embodiment, the alert communicates a network condition to the network manager, so that the network manager is provided with an opportunity to modify the network to mitigate the network condition. Alternatively or additionally, the trigger alerts another device in the wireless network of the network condition. The other device can modify its operation in an attempt to mitigate the network condition. For example, a testing device may detect that a throughput condition or a recently selected route of a nearby access node is adversely influencing the air-time capacity available to the testing device. As a result, the nearby device may be alerted, and the nearby device can modify its throughput or modify its routing selection in an attempt to mitigate the network condition.

As previously described, the other wireless device can include a wireless mesh gateway, a wireless mesh access node or a management server. The other wireless device can modify wireless network characteristics to mitigate the network condition. Exemplary wireless characteristics that can be modified includes, for example, routing selection, transmission channel selection, transmission power, transmission bit rate, packet QoS, and/or dis-associating a client.

Additional intelligence can be included for more precisely relating the conditions and activities of the wireless network to the observed or measure network conditions. For example, the test device can correlate the network condition with other activity of the wireless mesh network. Activities that can be modified include, for example, a routing path selection, a device channel selection and/or a device cluster selection.

In addition to wireless network activities of other devices, network conditions of other devices can be analyzed. For example, the test device can correlate the network condition with other conditions of the wireless mesh network. Exemplary network conditions include, for example, a device within the wireless network experiencing heavy loading, a hidden node condition, or limited availability of air-time.

The hidden node condition includes two wireless devices that are each able to wirelessly communicate with a third device, but not to each other. Therefore, each can interfere with the other's wireless communication with the third device. The test devices (client and/or access node) can help to identify hidden nodes. Once identified, the hidden node conditions can be addressed, for example, by a new route selection, a change in transmit power or a new channel selection.

Figure 5:
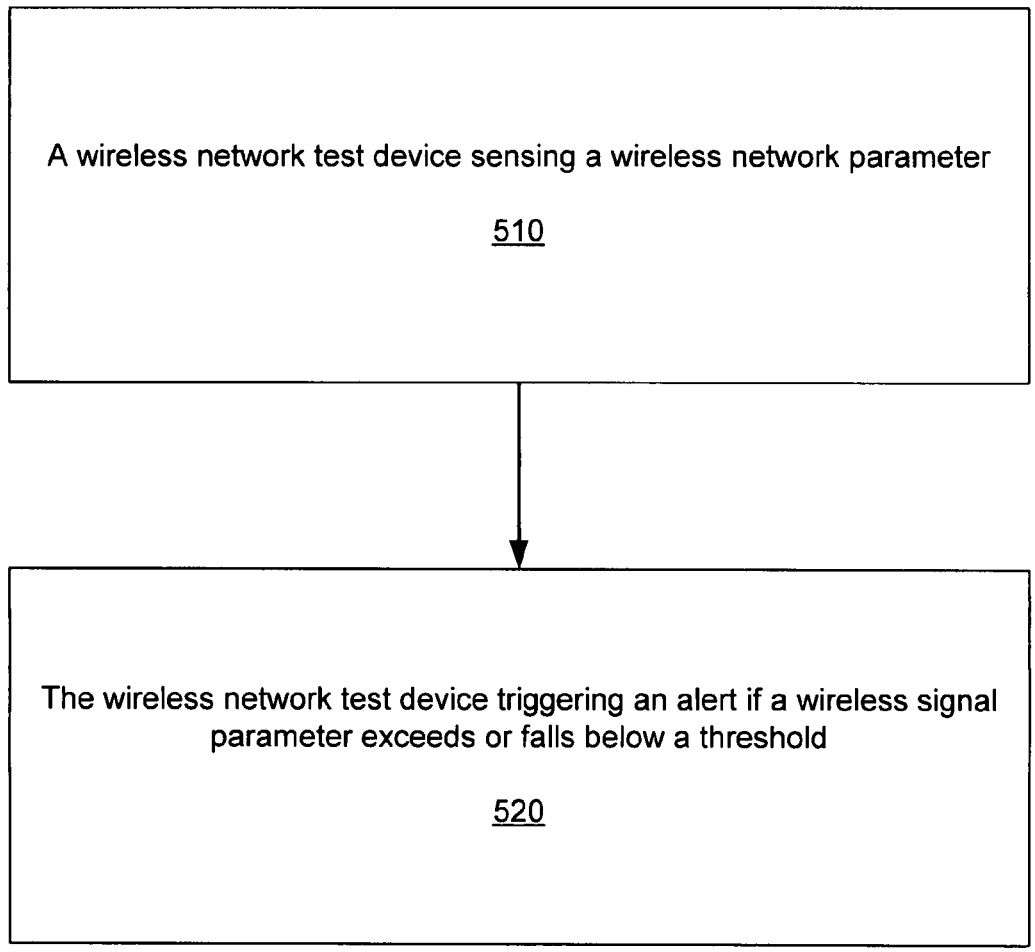
FIG. 5 is a flow chart that shows one example of steps of a method of a network test device sensing a network condition.

FIG. 5 is a flow chart that shows one example of steps of a method of a network test device sensing a network condition. A first step 510 includes a wireless network test device sensing a wireless network parameter. A second step 520 includes the wireless network test device triggering an alert if a wireless network parameter exceeds or falls below a threshold.

The triggering can be selected to identify situations in which the measured or monitored wireless network parameter is indicating a potential wireless network problem. For example, a low receive signal strength, a low receive signal SNR, a high number of transmission retries, a low upstream data throughput, a low downstream data throughput, a high latency, an/or low available air-time measured at the test device can indicate a problem within the wireless network. Threshold values for each of these wireless network parameters can be selected for providing an indication.

The triggered alert can be received by a network operator, or any device within the wireless network. The receiving device can be, for example, a device identified by location as the fundamental contributor of the wireless network condition.

Once a threshold value of at least one of the wireless network parameters has been detected, the wireless network parameter exceeding or falling below the threshold can be correlated with a condition or an activity of another device of the network. That is, as described, conditions or a recent activity of the other device within the wireless network could be the source of the detected problematic wireless network parameter. Therefore, correlating the problematic wireless network parameter with the condition or activity of another device can allow mitigation of the problematic wireless network parameter through modification of operation of the other device. Once identified, the correlation can be communicated to the other device. The other device can then modify its operation to mitigate the observed problematic behavior.

Although specific embodiments have been described and illustrated, the embodiments are not to be limited to the specific forms or arrangements of parts so described and illustrated.

What is claimed:

1. A method of determining a location of a network condition within a wireless mesh network, comprising:

a test device wirelessly connected directly to an access node of the wireless mesh network testing a first plurality of wireless hops of the wireless mesh network, the first plurality of hops including a wireless hop between the test device and the access node, comprising sending a probe packet from the test device to a first target device located the first plurality of wireless hops from the test device, and receiving a probe packet back from the first target device;

the test device testing a second number of wireless hops of the wireless mesh network, comprising sending another probe packet from the test device to a second target device located the second number of wireless hops from the test device, and receiving a probe packet back from the second target device;

wherein a number of the first plurality of wireless hops is different than the second number of wireless hops;

the test device locating a latency network condition within the wireless mesh network by comparing a round trip travel time of the probe packet of the first device with a round trip travel time of the probe packet of the second device, wherein the testing the first plurality of wireless hops comprises testing at least one of a upstream latency, downstream latency, upstream throughput, downstream throughput, a number of packet retries, packet success probability, reverse packet success probability and antenna asymmetry of at least one of the first plurality of wireless hops.

2. The method of claim 1, wherein the testing the second number of hops comprises testing at least one of a latency, a throughput, a number of packet retries, packet success probability, reverse packet success probability and antenna asymmetry of the second number of hops.

3. The method of claim 1, wherein the testing device emulates a client device connected to the wireless mesh network.

4. The method of claim 1, wherein the testing device emulates an access node connected to the wireless mesh network.

5. The method of claim 1, the first plurality of wireless hops and the second number of wireless hops are upstream wireless hops relative to the test device.

6. The method of claim 1, the first plurality of wireless hops and the second number of wireless hops are downstream wireless hops relative to the test device.

7. The method of claim 1, further comprising the test device determining wireless network parameters including at least one of receive signal strength, receive signal SNR, transmission retries, upstream data throughput, downstream data throughput, latency, and available air-time.

8. The method of claim 7, further comprising:
triggering an alert if at least one of the wireless network parameter exceeds or falls below a threshold.

9. The method of claim 8, wherein the alert comprises communicating with a network manager.

10. The method of claim 1, further comprising the test device communicating the location of the network condition to another device within the wireless mesh network.

11. The method of claim 10, wherein the other device comprises at least one of a wireless mesh gateway, a wireless mesh access node or a management server.

12. The method of claim 10, further comprising the other wireless device modifying wireless network characteristics to mitigate the network condition.

13. The method of claim 12, wherein the wireless network characteristic is at least one of routing selection, transmission channel selection, transmission power, transmission bit rate, packet QoS, dis-associating a client.

14. The method of claim 1, further comprising the test device correlating the network condition with other activity of the wireless mesh network.

15. The method of claim 14, wherein the other activity comprises at least one of:
a routing path selection, a device channel selection, a device cluster selection.

16. The method of claim 1, further comprising the test device correlating the network condition with other conditions of the wireless mesh network.

17. The method of claim 16, wherein the other condition comprise at least one of:
a device within the wireless network experiencing heaving loading, a hidden node condition, limited availability of air-time.

18. A test device wirelessly connected to an access node of a wireless mesh network, the test device operate to:

test a first plurality of wireless hops of the wireless mesh network, the first plurality of hops including a wireless hop between the test device and the access node, comprising sending a probe packet from the test device to a first target device located the first plurality of wireless hops from the test device, and receiving a probe packet back from the first target device;

test a second number of wireless hops of the wireless mesh network, comprising sending another probe packet from the test device to a second target device located the second number of wireless hops from the test device, and receiving a probe packet back from the second target device;

wherein a number of the first plurality of wireless hops is different than the second number of wireless hops;

locate a latency network condition within the wireless mesh network by comparing a round trip travel time of the probe packet of the first device with a round trip travel time of the probe packet of the second device, wherein the testing the first plurality of wireless hops comprises testing at least one of a upstream latency, downstream latency, upstream throughput, downstream throughput, a number of packet retries, packet success probability, reverse packet success probability and antenna asymmetry of at least one of the first plurality of wireless hops.

* * * * *